I. P. Wendell,
Journal Bearing.

No. 98,825. Patented Jan. 11, 1870.

Witnesses
S. H. Rumer
A. H. Boyer

Inventor,
Isaac P. Wendell,
Stephen Ustick atty.

United States Patent Office.

ISAAC P. WENDELL, OF PHILADELPHIA, PENNSYLVANIA, ASSIGNOR TO HIMSELF AND STEPHEN P. M. TASKER, OF SAME PLACE.

Letters Patent No. 98,825, dated January 11, 1870.

IMPROVEMENT IN JOURNAL-BEARINGS.

The Schedule referred to in these Letters Patent and making part of the same

I, ISAAC P. WENDELL, of the city of Philadelphia, and State of Pennsylvania, have invented certain Improvements in Journal-Bearings in relation to lubrication, of which the following is a specification.

The nature of my invention consists in the construction of the bearing with recesses in its wearing-surface, and small openings connecting the same with an oil-reservoir in the body of the bearing, and filling the said recesses with porous material, through which the oil oozes on to the periphery of the journal, as the latter revolves.

The recesses have flat surfaces, parallel, or nearly so, with the face of the bearing, so as to resist the upward passage of the journal as it bears upon the porous material, whereby the supply of oil is varied to suit the pressure upon the wearing-surface of the bearing, and the velocity of the journal, in accommodation to the lubrication required.

New bearings, before they become well fitted to their journals, are liable to heat, in consequence of but a small proportion of their wearing-surface taking the pressure of the latter, and hence I have found it necessary to charge them with a lubricating-material, even when the journals are lubricated from beneath.

For the accomplishment of this end, I construct the bearings with oil-reservoirs, as above mentioned, to hold oil enough to last until the faces of the bearings have been worn to a good fit. They may be refilled to aid the device beneath the journal in keeping up the requisite lubrication.

In some cases this new device may be sufficient of itself to keep up a perfect lubrication of the journal.

In the accompanying drawings, which make a part of this specification—

Like letters in all the figures indicate the same parts.

Figure 1:
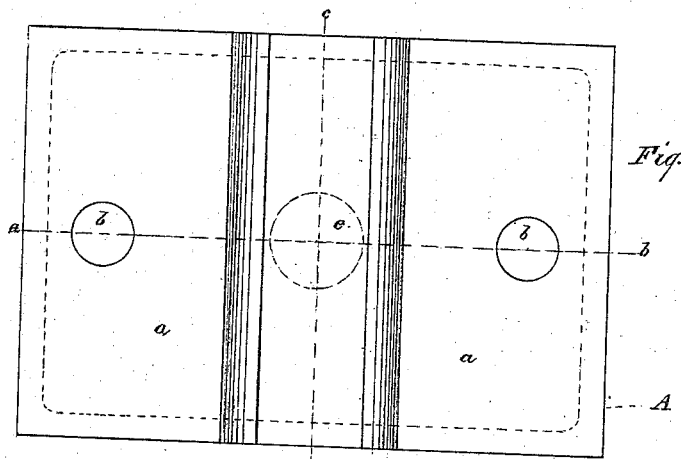
Figure 1 is a plan or top view of the improved bearing.
Figure 2:
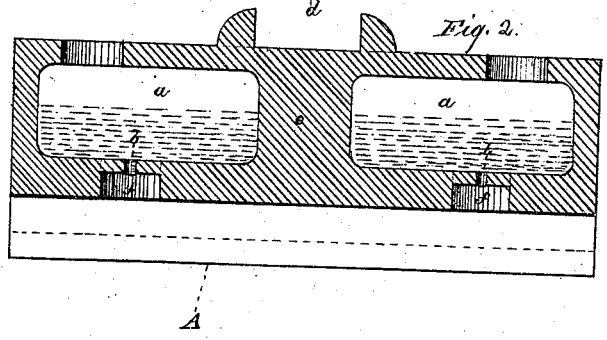
Figure 2 is a vertical section of the same at the line $a\ b$ of fig. 1.
Figure 3:
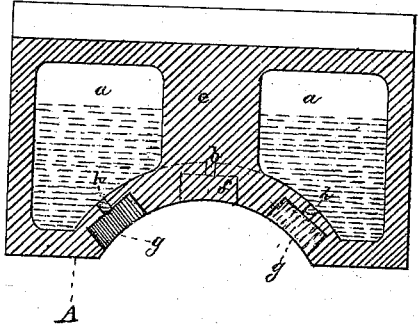
Figure 3 is a cross-section at the line $c\ d$ of fig. 1.
Figure 4:
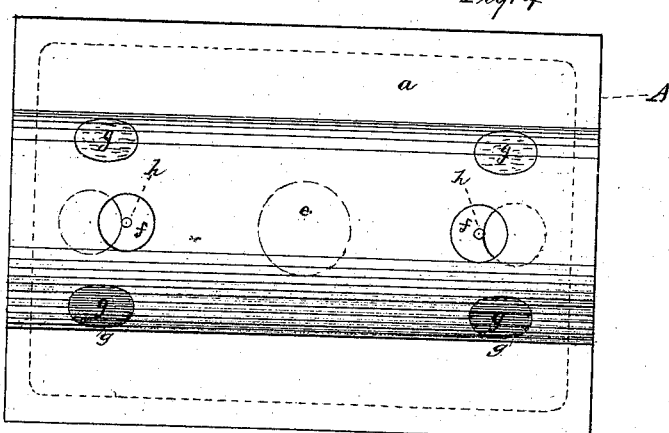
Figure 4 is a reversed plan of the bearing.

A is a journal-bearing of a car-axle, which has reservoir $a$ for holding the lubricating-material.

The said reservoir is filled with oil through either of the openings $b\ b$, there being one at each end, to provide for filling at the side of the car, outside of the pedestal, when either end of the bearing has an outward position, and admitting of the reversal of the bearing, to compensate for the unequal wearing at the ends of the same.

To preserve sufficient strength in the bearing when its sides are brought to a moderate thickness, in coring out the reservoir $a$, I leave standing one or more braces, $e$, as seen in the drawings.

There are recesses $f$ in the face of the bearing, in which is placed porous material, $g$, through which oil oozes on to the periphery of the journal as the latter revolves, the oil being permitted to pass from the reservoir $a$ through the small openings $h$, which connect the recesses with the reservoir.

The porous material $g$ may be of rattan, or any other substance or composition which will admit of a regular and sufficiently rapid flowing through or oozing of the oil when the journal is in motion. I have sometimes used a mixture of black lead and asbestos, and have found it to answer the purpose very well.

The porous material is made even with the wearing-surface of the bearing, and being more or less elastic, always bears upon the journal sufficiently to distribute the oil upon the same as the latter revolves, and consequently the distribution will be increased or decreased in proportion to the upward pressure, and the velocity of the journal at all times, and thus in adaptation to the requisite lubrication.

The flat surfaces prevent the receding of the filling $g$ from the journal, so as to preserve a continual uniform wearing-surface of the metal and filling at all times, no matter how great be the upward pressure of the journal, or how high the velocity.

I disclaim the use of porous material placed in openings in the cap of journal-boxes for machinery.

What I claim as my invention, and desire to secure by Letters Patent, is—

1. The construction of the journal-bearing A, with recesses $f$ and openings $h$, which connect the said recesses with the oil-reservoir $a$, when said recesses and openings are constructed and arranged in relation to the wearing-surface of the bearing and the reservoir, and the recesses are filled with a porous material, through which the oil oozes on to the journal, substantially as described.

2. The combination of a porous material with an enclosed journal-bearing, where the whole pressure of the latter comes upon the journal and the said lubricating-media, and the latter is confined in recesses between which and an oil-reservoir in the body of the bearing there is an open communication for the passage of the oil, substantially as above set forth.

In testimony whereof, I have hereunto set my hand and affixed my seal, this 12th day of September, 1869.

ISAAC P. WENDELL. [L. S.]

Witnesses:
 STEPHEN USTICK,
 JOHN WHITE.